June 4, 1963
M. J. PURETIC
3,091,879
BRAILER APPARATUS FOR USE WITH A FISHING BOAT
Filed July 24, 1961
6 Sheets-Sheet 1
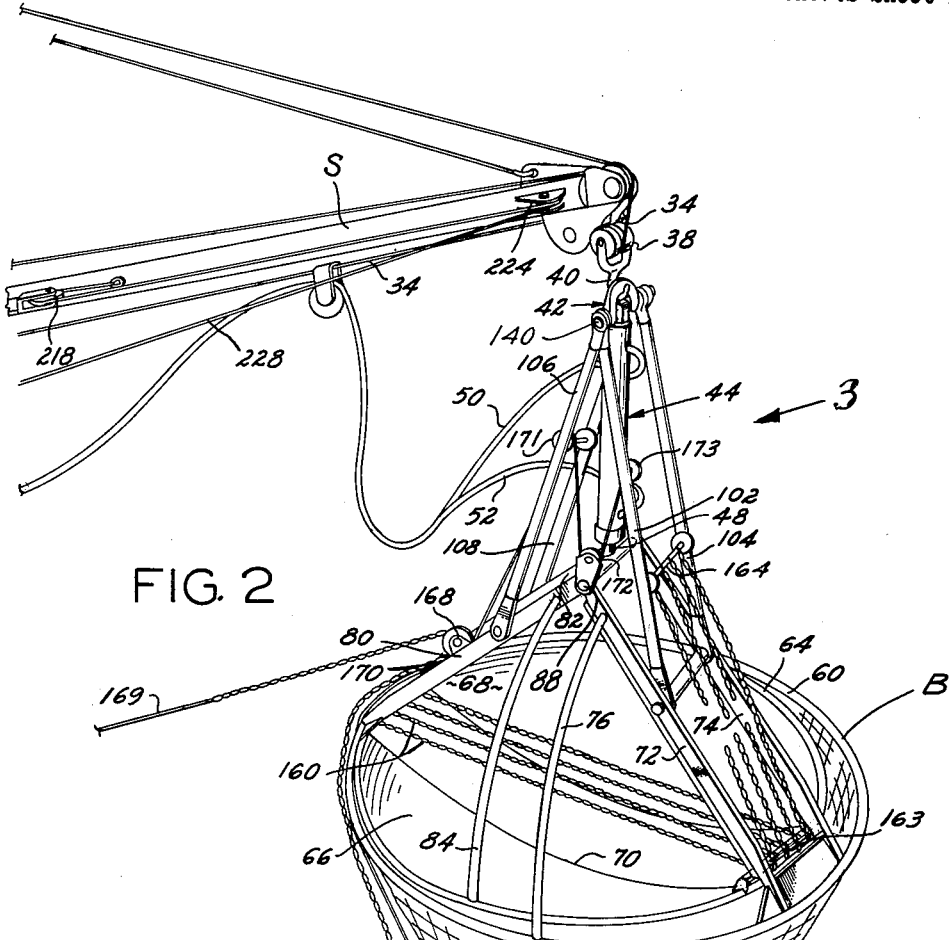
FIG. 2
FIG. 1
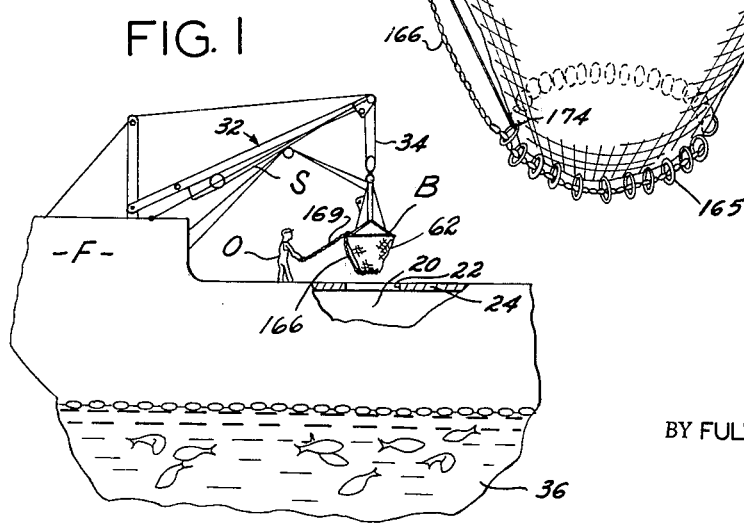
INVENTOR.
MARIO J. PURETIC
BY FULWIDER, MATTINGLY
& HUNTLEY
ATTORNEYS

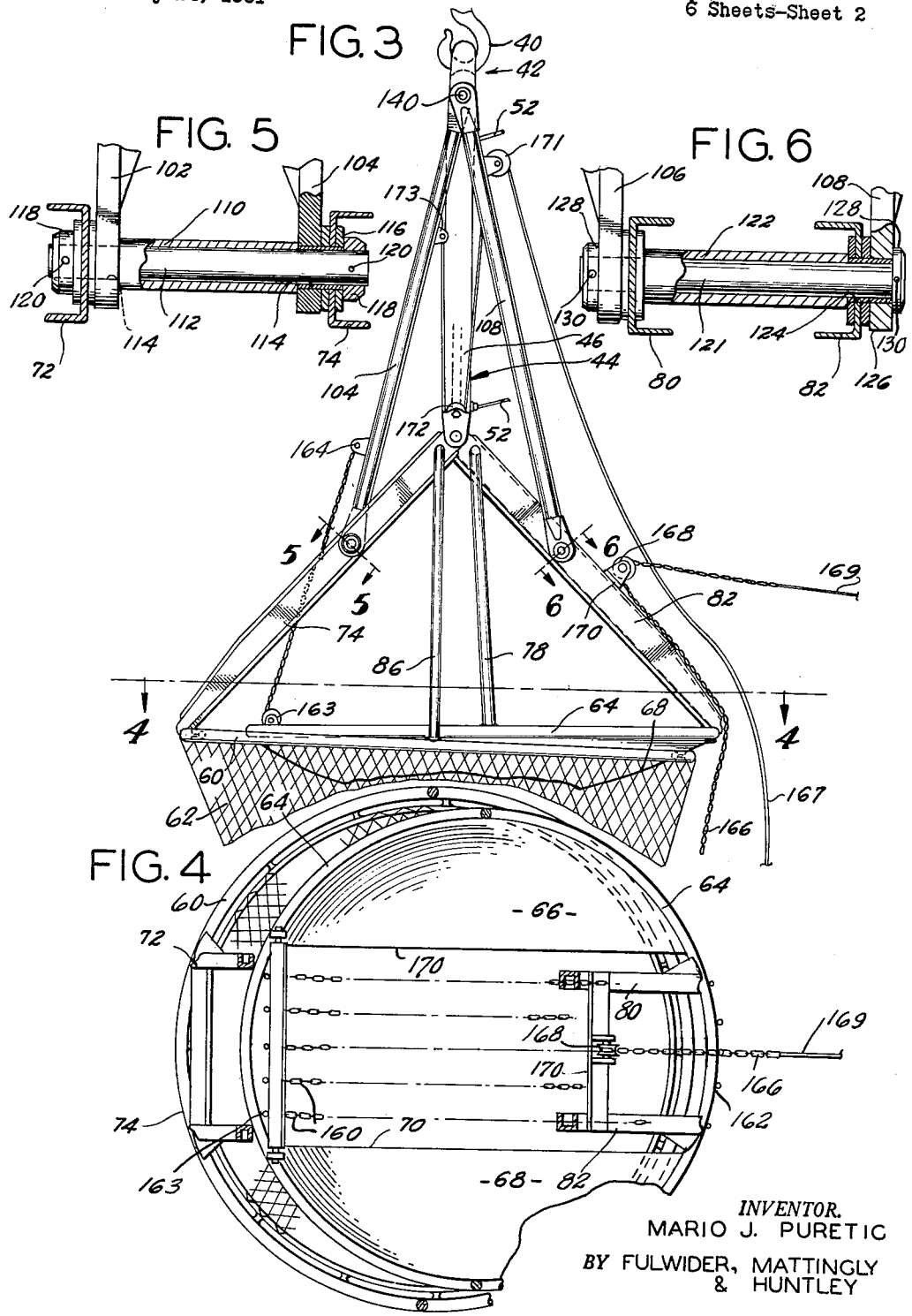

June 4, 1963
M. J. PURETIC
3,091,879
BRAILER APPARATUS FOR USE WITH A FISHING BOAT
Filed July 24, 1961
6 Sheets-Sheet 3
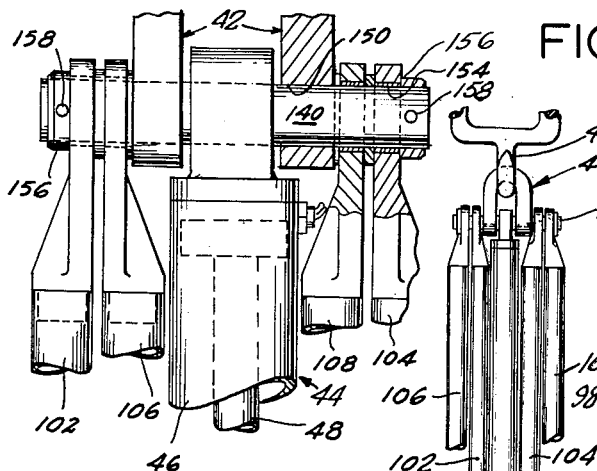
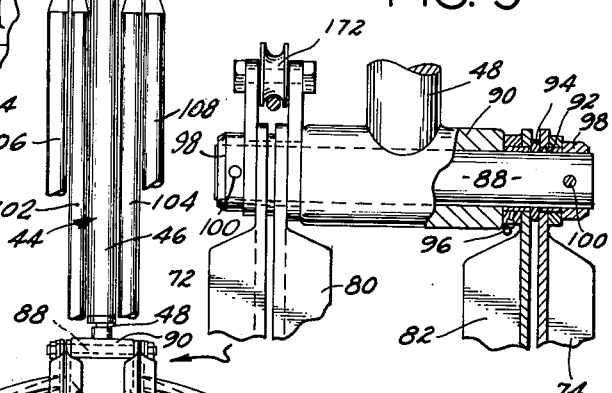
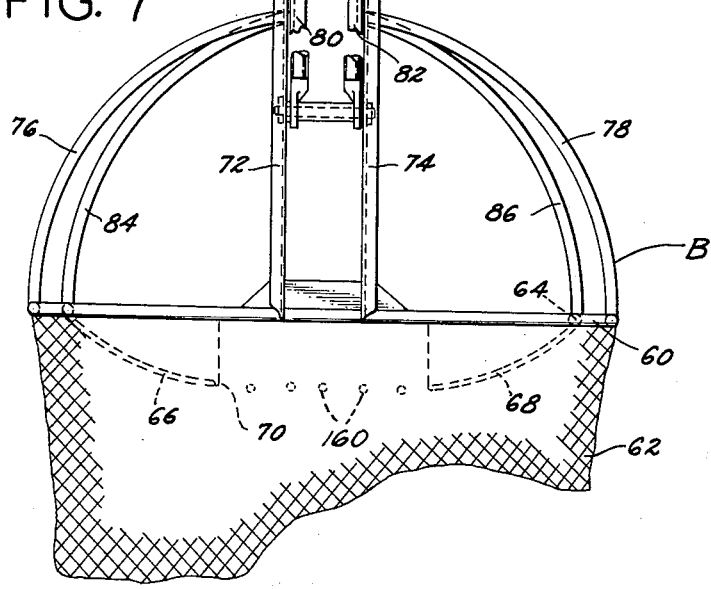
*INVENTOR.*
MARIO J. PURETIC
BY FULWIDER MATTINGLY
& HUNTLEY
ATTORNEYS

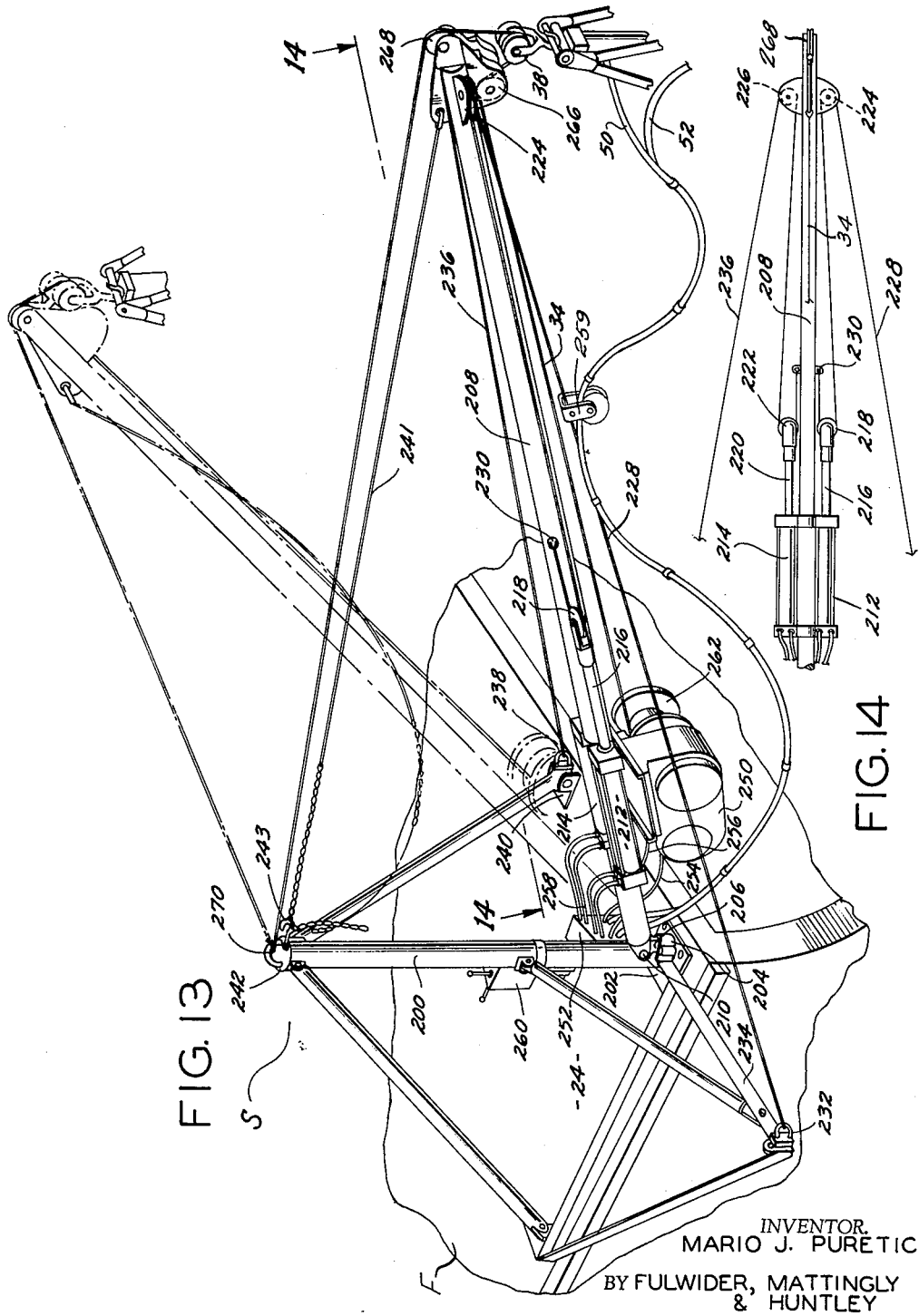

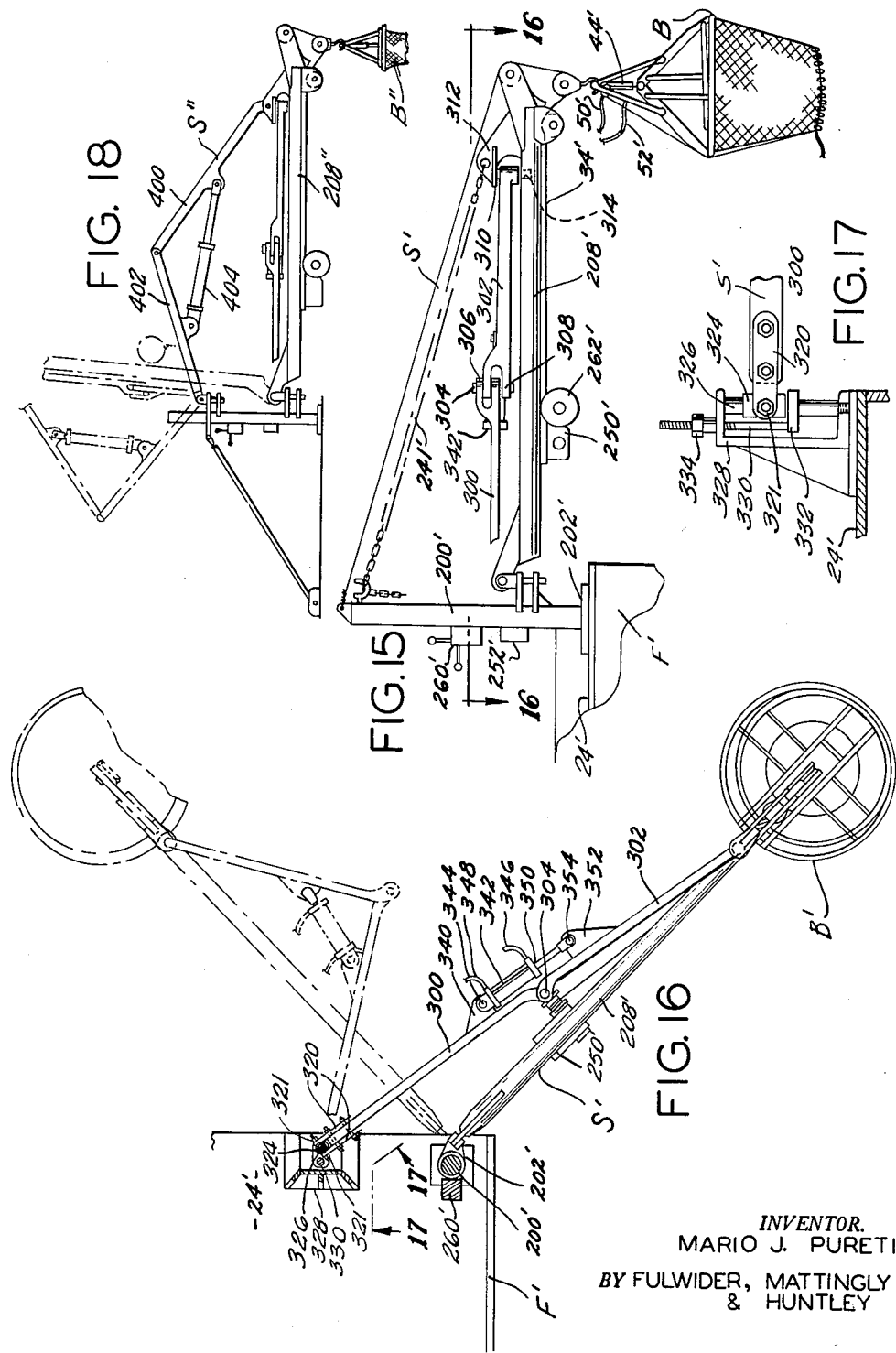

United States Patent Office 3,091,879
Patented June 4, 1963

3,091,879
BRAILER APPARATUS FOR USE WITH A
FISHING BOAT
Mario J. Puretic, 30514 Avenida Corona,
San Pedro, Calif.
Filed July 24, 1961, Ser. No. 125,999
10 Claims. (Cl. 43—6.5)

The present invention relates generally to the art of fishing and more particularly to novel brailer apparatus for recovering fish from a net and transferring such fish to a fishing boat.

Fishing is one of the oldest arts. Yet comparatively little has been done over the years to change apparatus and methods that have been followed in the fishing art for centuries. A fundamental and novel advance in the art of fishing is disclosed in my United States Letters Patent Nos. 2,733,530 and 2,733,531, issued February 7, 1956. These patents relate to an apparatus and method for drawing a net alongside a fishing boat by means of a power-driven block suspended from a boom on the boat. The use of such power-driven block has greatly expedited the hauling-in of the net alongside the boat, and it has been possible in many cases to substantially reduce the number of men required for a commercial fishing boat crew. Although the use of such power-driven blocks permits the netted fish to be brought alongside the fishing boat in a minimum period of time, there still remains the difficult problem of recovering the fish from the net and transferring such fish into the hold of the fishing boat.

It is conventional to scoop the netted fish from the net by means of a shallow, basket-like device, generally termed a brailer. This brailer generally comprises a rigid hoop approximately five or six feet in diameter from which depends an open-topped bag-like net. The hoop is attached to a long handle. This handle is manipulated by two or three men positioned in a large skiff alongside the fishing boat. These men manually urge the hoop into the mass of heavy fish within the seine. Thereafter, the hoop is hoisted towards the fishing boat by means of a line attached thereto and extending to the fishing boat's deck. During this operation the skiff is usually pitching heavily in the sea. Thus, the brailing operation is a dangerous job requiring great experience and tremendous strength. Moreover, this operation is time consuming.

It is a major object of the present invention to provide novel brailer apparatus for rapidly transferring netted fish onto a fishing boat.

In general, the brailer apparatus of the present invention includes a basket member that is movable between an open position and a closed position. This basket member is supported by a boom or the like disposed upon a fishing boat. After a fish-containing net has been brought alongside the fishing boat, the basket is lowered into the netted fish in an open position. Thereafter, the basket is closed so as to trap or grab a portion of the netted fish within its confines. Next, the closed basket and its load of fish are raised and swung over the fish-receiving hold of the boat. Finally, the contents of the basket are dumped so as to discharge the trapped fish into the fish-receiving hold of the boat.

It is an object of the present invention to provide brailer apparatus of the aforedescribed nature which is power operated and permits the brailing operation to be conducted with a minimum expenditure of labor.

Another object of the present invention is to provide brailer apparatus that permits the brailing operation to be accomplished in a minimum amount of time. This time saving is extremely important since when a fish school is sighted it is highly desirable to quickly run the net, capture the fish and transfer them rapidly to the hold of the fishing boat in order that the school may be quickly followed and more fish captured.

Another object of the present invention is to provide brailer apparatus which is fool-proof in operation, simple of design and rugged of construction whereby it may provide a long and trouble-free life.

An additional object of the present invention is to provide brailer apparatus for transferring netted fish onto a fishing boat that includes support means carried by the fishing boat, a vertically extending longitudinally collapsible actuating member carried by the support means, a basket member operatively connected to the actuating member for movement between an open position and a closed position as the actuating member is longitudinally collapsed, means operatively connected to the fishing boat for effecting longitudinal collapse of the actuating member in order that the basket member may be lowered into the netted fish in an open position and thereafter closed so as to trap a portion of the netted fish, with the closed basket thereafter being moved by said support means into a fish-discharging position over the boat and the basket then being dumped to discharge the load of fish therein onto the boat.

Another object is to provide brailer apparatus of the aforedescribed nature which may be stored in a minimum space when not in use.

A more particular object of the present invention is to provide brailer apparatus of the aforedescribed nature where said basket member may be dumped either by means of an integral dumping means or alternatively by effecting movement of the basket member to its open position.

These and other objects and advantages of the present invention will become apparent from the following detailed description when taken in conjunction with the appended drawings wherein:

FIGURE 1 is a side elevational view, showing a preferred form of brailer apparatus embodying the present invention in the step of discharging a load of fish into the fish-receiving hold of a fishing boat;

FIGURE 2 is a perspective view of said brailer apparatus in enlarged scale relative to FIGURE 1, with the parts thereof being arranged in the same position as in FIGURE 1;

FIGURE 3 is a broken side elevational view of the upper portion of the basket member of said brailer apparatus taken from the point designated "3" in FIGURE 2, and particularly showing its interconnection to an actuator member employed to move said basket member between an open position and a closed position;

FIGURE 4 is a horizontal sectional view taken on line 4—4 of FIGURE 3;

FIGURE 5 is an inclined sectional view taken in enlarged scale on line 5—5 of FIGURE 3;

FIGURE 6 is an inclined sectional view taken in enlarged scale along line 6—6 of FIGURE 3;

FIGURE 7 is a front elevational view similar to FIGURE 3, but taken at 90 degrees therefrom;

FIGURE 8 is an enlarged fragmentary view taken partly in vertical sectional showing details of the elements appearing at the upper portion of FIGURE 7;

FIGURE 9 is an enlarged fragmentary view taken partly in vertical section showing details of the elements appearing in the midportion of FIGURE 7;

FIGURE 13 is a perspective view showing the construction and operation of a first form of boom member utilized with said brailer apparatus;

FIGURE 14 is a section view taken along line 14—14 of FIGURE 13;

FIGURE 15 is a side elevational view showing the construction and operation of a second form of boom member usable with said brailer apparatus;

FIGURE 16 is a horizontal sectional view taken on line 16—16 of FIGURE 15;

FIGURE 17 is a fragmentary view in enlarged scale taken along the line 17—17 of FIGURE 16; and FIGURE 18 is a side elevational view showing a third form of boom member usable with said brailer apparatus.

Figure 10:
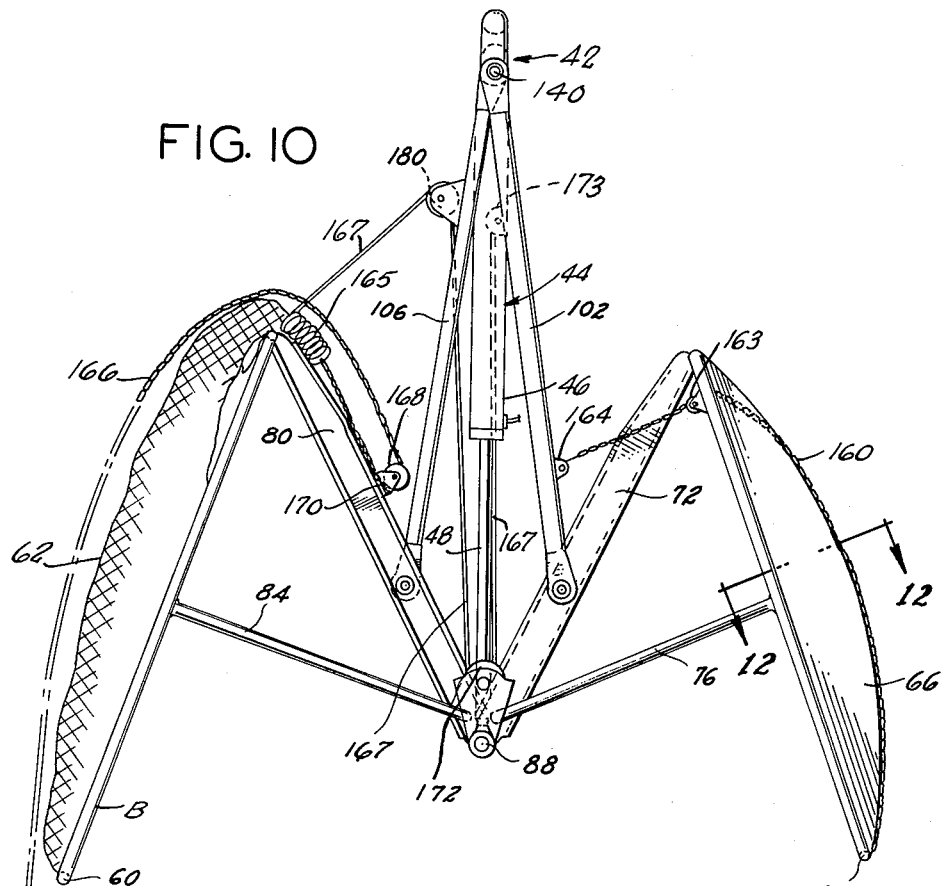
FIGURE 10 is a side elevational view showing said basket member in open position ready to engage fish (not shown)

Referring to the drawings and particularly FIGURE 1 thereof, the preferred form of brailer apparatus embodying the present invention is shown in conjunction with a conventional fishing boat F. The boat F is provided with a fish-receiving hold 20 having a hatch 22 formed in the boat's desk 24. The brailer apparatus includes a basket member B which is movable relative to the boat F by means of suitable support means such as boom member S. With this arrangement, the basket member B may be operated in a manner fully described hereinafter to transfer fish netted within a net 36 drawn alongside the boat F to the fish-receiving hold 20.

The boom member S includes a lifting line 34 that serves to raise and lower the basket member B relative to the boat F and the water. The lifting line 34 is arrange in a manner to be fully described hereinafter to raise and lower a block 38. The lower end of the block 38 is provided with a hook 40. The hook 40 is removably engageable with a hanger, generally designated 42. The hanger 42 is disposed at the upper end of a vertically extending longitudinally collapsible actuating member, generally designated 44. The basket member B is operatively connected to the actuating member 44 so as to be movable between a closed position shown in FIGURES 1, 2, 3, and 7 and an open position shown in FIGURE 10 upon longitudinal movement of the actuating member, as will be apparent by a comparison of FIGURES 3 and 10.

The actuating member 44 includes a vertical cylinder 46 wherein a plunger 48 is longitudinally slidably disposed. Vertical reciprocation of the plunger 48 relative to the cylinder 46 is effected by fluid pressure in a conventional manner with pressurized fluid being transmitted to and from the upper and lower ends of the cylinder 46 by means of flexible conduits 50 and 52, respectively.

Referring particularly to FIGURES 2 and 7, the basket member B includes a rigid metallic hoop 60 which extends horizontally when the basket member is in a closed position. An open topped bag 62 formed of netting depends from the hoop 60. An auxiliary hooped element 64 is disposed within the hoop 60 when the basket is in closed position. The auxiliary hoop 64 is of smaller diameter than the hoop 60. A pair of downwardly dished semi-hemispherical shields 66 and 68 are rigidly secured within the side portions of the auxiliary hoop 64. The proximate edges of these shields define a slot 70.

As particularly shown in FIGURES 3, 7 and 10, one side of the hoop 60 is rigidly affixed as by welding to a pair of parallel crank arms 72 and 74. The crank arms 72 and 74 are of channel-type metallic construction. A pair of upwardly and inwardly curved braces 76 and 78 rigidly interconnect the midportion of the hoop 60 to the upper ends of the crank arms 72 and 74. The crank arms are seen to be inclined upwardly and radially inwardly relative to the hoop 60 when the basket member is in a closed position. The auxiliary hoop 64 is rigidly affixed as by welding to a pair of upwardly and inwardly inclined crank arms 80 and 82, similar to the aforedescribed crank arms 72 and 74. Likewise, a pair of upwardly and inwardly curved braces 84 and 86 rigidly interconnect the midportion of the auxiliary hoop 64 with the upper portion of the crank arms 80 and 82.

The upper ends of the crank arms 72 and 74 and the crank arms 80 and 82 are pivotally interconnected by a horizontal pivot pin 88. As indicated particularly in FIGURES 7 and 9, the pivot pin 88 is supported within a boss 90 that is rigidly secured to the lower end of the plunger 48. The upper end of the aforementioned crank arms are formed with horizontally aligned bores as indicated at 92 which receive suitable bushings 94 carried by the opposite ends of the pivot pin 88. A conventional grease fitting 96 may be provided for lubrication. The ends of the pivot pin 88 are provided with retainers 98 that are secured in place as by locking pin elements 100.

As shown particularly in FIGURES 2 and 3, the intermediate portion of the crank arms 72 and 74 are pivotally interconnected to the lower end of a pair of parallel links 102 and 104. Similarly, the intermediate portion of the crank arms 80 and 82 are pivotally interconnected to the lower ends of a second pair of parallel links 106 and 108. The connection of the lower ends of the aforementioned links to the intermediate portions of the crank arms are similar and the details thereof are shown in FIGURES 5 and 6. Referring now to FIGURE 5, the lower ends of the links 102 and 104 are bridged by a horizontal tube 110. A pivot pin 112 rotatably extends through the tube 110 and through aligned bores formed in the links as indicated at 114. The crank arms 72 and 74 are similarly formed with aligned bores as indicated at 116 for receiving the pin 112. Suitable retainers 118 are secured to the opposite ends of the pivot pin 112 by locking pin elements 120. Referring to FIGURE 6, a similar construction is provided for the other crank arms 80 and 82 utilizing a pivot pin 121. In this case, however, the horizontal tube 122 extends between the crank arms 80 and 82. The pin 121 extends through aligned bores formed through the crank arms and the lower ends of the links 106 and 108, as indicated at 124 and 126, respectively. Suitable retainers 128 are secured to the opposite ends of the horizontal pivot pin 121 by means of locking pin elements 130.

Referring now particularly to FIGURES 2, 7 and 8, the hanger 42 includes a horizontal pivot pin 140. The hanger also includes a wishbone element 142 having a pair of depending legs 144 and 146. The lower ends of these legs are formed with horizontally aligned bores as indicated at 150 in FIGURE 8 to receive the intermediate portion of the pivot pin 140. The upper portion of the wishbone 142 is formed with an annular opening 152 that receives the aforedescribed hook 40 of the block 28. The upper ends of the links 102, 104, 106 and 108 are formed with horizontally aligned bores to receive the opposite end portions of the pivot pin 140, as indicated at 154. The outer ends of the pivot pin 140 are provided with suitable retainers 156 which are held in position on the pivot pin by locking pin elements 158.

As shown particularly in FIGURES 2, 3 and 4, a plurality of chains 160 extend generally parallel with and are disposed within the confines of the slot 70 defined by the shields 66 and 68. One end of each chain 160 is rigidly affixed to the auxiliary hoop as by welding, as indicated at 162 in FIGURE 4. The intermediate portions of the chain slidably extend over a bar 163 extending across the side of the auxiliary hoop 64 diametrically opposite the point of interconnection of the chains to this hoop. The chains then extend upwardly and radially inwardly to a horizontal cross piece 164 extending between the lower portions of the links 102 and 104.

The lower end of the bag 62 is normally open, as indicated in FIGURES 1 and 2. The lower end of the bag is provided with a plurality of circumferentially spaced loops 165. These loops slidably receive a dumping chain 166, with one end of the dumping chain being affixed to a deflecting line 167 that extends upwardly for a purpose set forth hereinafter. The opposite end of dumping chain 166 extends upwardly through a pulley 168 and is then attached to a dump line 169 adapted to be grasped by an operator O disposed upon the fishing boat F, as indicated particularly in FIGURE 1. The pulley 168 is secured to a plate 170 extending between crank arms 80 and 82. The dimensions of the loops 165 and the dumping chain 166 should be such that when the dumping chain is pulled tightly to reduce its length within the loops the chain will contract the lower end of the bag 62 so as to effectively close such lower end. In closing the lower end of the bag 62 the chain 166 acts in the same manner as a draw string. The lower end of the bag 62 is normally retained in its closed position because of the frictional engagement of the links of the dumping chain 166 with the loops 165, particularly with fish disposed therewithin, the weight of the fish increasing the frictional resistance of the chain relative to the loops.

Referring particularly to FIGURES 2, 3 and 10, it will be noted that the deflecting line 167 extends upwardly around a sheave 171 that is supported between the intermediate portions of the links 106 and 108. The line 167 then extends downwardly through a pulley 172 that is carried by one end of the pivot pin 88. The deflecting line 167 then extends upwardly to a fixed ear 173 that is secured to the link 106. The length of the deflecting line 167 is so selected that with the operator O holding the line 169 tight, movement of the basket member B from its closed position to its open position will deflect the lower end of the bag 62 upwardly to its position of FIGURE 10. The bag 62 will thereby be prevented from becoming pinched between the hoops 60 and 64.

Referring now particularly to FIGURES 13 and 14, the boom member S includes a suitably braced upstanding mast 200 provided at its lower end with a base 202 that is affixed to the deck 24 of the fishing boat F. The base 202 is formed with a socket element 204 to receive a king pin 206. The king pin 206 is supported for movement about a vertical axis and is connected at its upper end to a boom 208 by means of a horizontal pivot pin 210. The boom 208 is thus movable about a vertical and a horizontal axis relative to the mast 200.

The lower portion of the boom 208 is provided with a pair of fluid pressure operated cylinders 212 and 214 arranged on either side thereof. The first cylinder 212 is provided with a ram 216 that extends out of the cylinder towards the free or head end of the boom 208 and parallel therewith. At the upper end of the ram 216 there is mounted a pulley 218. In a similar manner the second cylinder 214 is provided with a double-acting ram 220 to the upper end of which is mounted a second pulley 222. The free end of the boom 208 is provided with a head pulley 224 in alignment with the pulley 218. Similarly, the opposite side of the boom is provided with a similar head pulley 226, shown particualrly in FIGURE 14. A flexible cable 228 has one end rigidly affixed to the intermediate portion of the boom at point 230. This cable 228 extends from the point 230 around the ram pulley 218 and thence through the head pulley 224. From the head pulley 224 the cable 228 extends rearwardly to an ear 232. The ear 232 is rigidly affixed to the end of a fixed horizontal arm 234. The end of the arm 234 opposite the ear 232 is rigidly affixed to the base of the mast 200. A second cable 236 is provided for the opposite side of the boom 208 so as to extend from the ram pulley 222 around the head pulley 226 and thence to a fixed ear 238. The latter is secured to a bracket 240 fixedly attached to the deck 24 in approximate alignment with the ear 232.

An elevation control line 241 extends from the head of the boom 208 to a cap 242 secured to the upper end of mast 200. The end of the line 241 adjacent the mast 200 may consist of chain links selectively engageable with a hook 243 affixed to the cap 242. In this manner the effective length of the line 241 may be varied to thereby adjust the height of the free end of boom 208.

Disposed below the cylinders 212 and 214 on the boom 208 is a conventional power-operated winch 250. The winch 250 will preferably be operated by the same pressurized fluid utilized to actuate the cylinder 46 and plunger 48 of the actuating member 44, as well as the hydraulic cylinder and ram units 212, 216, 214 and 220. To this end the winch 250 is connected to a valve unit 252 mounted upon the mast 200 by conduits 254 and 256. Similarly, the cylinder and ram units will be connected to the control box 252 by suitable conduits indicated generally at 258. As shown particularly in FIGURE 13, the conduits 50 and 52 of the actuating member 44 are also operatively connected with the valve unit 252. These conduits 50 and 52 extend through a suitable sheave 259 that depends from the intermediate portion of the boom 208. The valve unit 252 is actuated by means of a control box 260 mounted upon the rear of the mast 200, as will be clear by reference to FIGURE 13. This control box 260 is provided with suitable handles or the like whereby the operation of the actuating member 44, the cylinder and ram units and the power winch may be effected by a single operator.

The power winch 250 includes a reel 262 at its forward portion. The reel 262 serves to advance and retract the aforedescribed lifting line 34. The lifting line 34 extends forwardly from the reel 262 below the ram 208 to a head sheave 266 carried at the front underside of the boom 208. The lifting line 34 then extends around the block 38. From the block 38 the lifting line 34 extends upwardly around a guide sheave 268 carried by the upper front end of the boom 208. The lifting line extends from the guide sheave 268 upwardly and rearwardly to the top of the mast 200 at which point the end of the lifting line opposite the reel 262 is rigidly affixed to the cap 242 carried by the upper end of the mast 200.

With the aforedescribed arrangement, the boom 208 may be caused to swing in a horizontal plane from a position inboard of the boat F to a point located outboard thereof. The first point will be in vertical alignment with the fish-receiving hold 20 shown in FIGURE 1. The second point will be in vertical alignment with the fish-containing portion of the net 36. To effect such horizontal pivotal movement the control box 260 is manipulated to direct the admission and discharge of pressurized fluid to the cylinders 212 and 214. As pressurized fluid is directed to the cylinder 212 to retract the ram 216, the ram 220 will be undergoing extension relative to its cylinder 214. This will cause the boom 208 to swing in a clockwise direction relative to its position shown in FIGURE 15. A reversal of this operation will effect counter-clockwise movement of the boom.

The power winch 250 serves to elevate and lower the basket member B relative to the head of the boom 208. This is effected by rotation of the reel 262. When the reel unreels the lifting line 34, the basket member B will be lowered under the influence of gravity. Conversely, upon rotation of the reel 262 to reel in the lifting line 34, the basket member will be raised. It should be particularly noted that at such time as the basket member is raised to the extent that the block 38 abuts the free end of the boom 208, continued reeling in of the lifting line 34 will serve to raise the free end of the boom 208 to its dotted outline inoperative position shown in FIGURE 13. In this inoperative position the boom 208 and the basket member B will occupy a minimum space on the boat F.

In the operation of the aforedescribed apparatus, the fish-containing net 36 is first brought alongside the fishing boat F as indicated in FIGURE 1. Thereafter, the boom member S is operated so as to bring the basket member B in vertical alignment with the portion of the net 36 from where it is desired to withdraw netted fish. The power winch 250 will be caused to let out the lifting line 34 whereby the basket member B is lowered from its inoperative dotted outline position of FIGURE 13 to its operative position shown in solid lines therein. At this time the lower end of the bag 62 is closed.

Fluid pressure is then admitted to the cylinder 46 so as to cause the plunger 48 to be extended downwardly from its retracted position of FIGURES 1 and 2 to its extended position of FIGURE 10. This serves to move the basket member B from its closed to its open fish-receiving position. The power winch 250 is then actuated to extend the lifting line 34 and thereby lower the basket member B into the netted fish. At this time the parts of the basket member B and the actuating member 44 will be disposed in the positions shown in FIGURE 10. With the aforementioned parts so positioned, and with particular reference to FIGURE 10, it will be observed that the deflecting line 167 will be maintaining the lower end of the bag 62 in a raised position free and clear of the lower end of the hoop 60. If this arrangement were not provided it would be possible for the lower end of the bag 62 to become folded over the lower end of the hoop 60 and thereby cause interference with the fish entering the confines of this bag.

Figure 12:
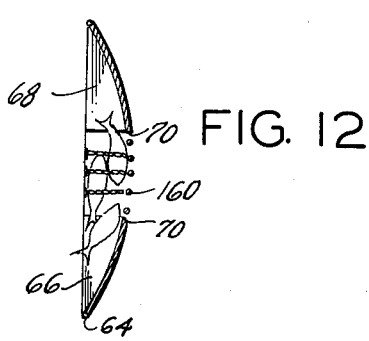
FIGURES 11 and 12 are diagrammatic views showing the operation of chain elements employed with said basket member.
Figure 11:
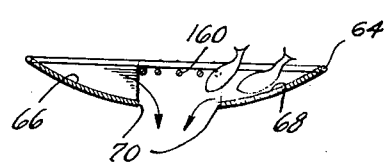

The plunger 48 is then retracted within its cylinder 46 so as to move the parts of the basket member B to their closed position of FIGURES 2 and 3. During such movement, the hoop 60 and auxiliary hoop 64 will be pivoted towards one another so as to thereby scoop the netted fish into the confines of the bag 62. In this operation, the shields 66 and 68 will cooperate with the chain elements 160. At this time, these chain elements will be in a slackened condition. Accordingly, as indicated in FIGURE 12, the chain elements will generally conform to the curvature of the shields 66 and 68 when engaging fish to permit the trapping of a maximum number of fish. As indicated in FIGURE 11, movement of the auxiliary hoop 64 to its horizontal position will serve to tighten the chain elements 160. In this manner, any fish caught between the chain elements and the shields 66 and 68 will be spilled so as to fall downwardly within the confines of the bag 62.

The loaded basket member B will next be lifted out of the water by the lifting line 34 under the influence of the power winch 250. Next, the control box 260 of the boom member S will be operated so as to swing the boom 208 horizontally until its free end and hence the basket member B are in vertical alignment with the hatch 22 of the fish-receiving hold 20. The operator O will thereafter slack off on the dumping line 169. This serves to free the links of the dumping chain 166 relative to loops 165 and thereby permits the lower end of the bag 62 to open. The fish contained within the bag will then fall into the confines of the hold 20. Thereafter, with the operator O exerting a pull upon the dumping line 169, the basket member is closed. As the basket member is closed the dumping chain will be contracted relative to the loops 165 by means of the tightened deflecting line 167. The lower end of the bag 62 will in this manner be drawn closed. The boom member S will then return the basket member B to a position over the net 36 and the operation may be repeated.

Referring now to FIGURES 15, 16 and 17, there is shown a second form of boom member S' usable with the brailer apparatus of the present invention. The boom member S' includes a boom 208' similar to that shown in the preceding figures. Additionally, the boom 208' is provided with a power winch 250 having a reel 262' that operates a lifting line 34', with the lifting line 34' being utilized to elevate and lower a basket member B' similar to the aforedescribed basket member B of FIGURES 1 through 14. The basket member B' is moved between an open and closed position by means of a cylinder-plunger type actuator member 44'. The boom 208' is attached to an upstanding mast 200' whereon are disposed a valve unit 252' and a control box 260'. In general, the second form of boom member S' is similar to the first form except for the means employed to effect horizontal pivotal movement of the boom 208'.

The boom 208' is caused to undergo horizontal pivotal movement under the influence of a pair elbow rods 300 and 302 having their adjoining ends interconnected by a vertical pivot pin 304. These adjacent ends are provided with suitable bifurcations 306 and 308 respectively, for receiving the vertical pivot pin 304. The front end of the rod 302 is connected to the front or head end of the boom 208' by means of a vertical pivot pin 310. The pivot pin 310 has its upper end secured to a rearwardly and upwardly extending bracket 312 that is rigidly secured to the front end of the boom 208'. The lower end of the pivot pin 310 is disposed within a suitable socket 314 formed adjacent the head of the boom 208'.

The rear end of the elbow rod 300 is rigidly connected to a pair of rearwardly extending straps 320. The rear end of these straps 320 are formed with horizontally aligned bores to receive a pair of horizontally extending pivot pins 321 which are integrally formed on the sides of a vertically extending tube 324. The tube 324 is rotatably and axially slidably disposed upon a vertically extending support rod 326. The upper and lower ends of the support rod 326 are anchored within a mounting bracket 328 of generally reverse C configuration that is rigidly affixed to the deck 24' of the fishing boat F' in approximate horizontal alignment with the base 202' of the mast 200', as indicated in FIGURE 16. The elevation of the tube 324 relative to the support rod 326 is controlled by means of a generally L-shaped adjusting post 330. The lower end of the adjusting post is provided with a horizontally extending leg 332. The upper end of the adjustment post 330 is externally threaded to receive an adjustment nut 334. The adjustment nut 334 rides upon the upper surface of the mounting bracket 328.

The intermediate portion of the elbow rod 300 is formed with a bracket 340. This bracket 340 is connected to a fluid pressure operated cylinder 342 by means of a vertical pivot pin 344. Flexible conduits 346 and 348 connect the cylinder 342 with the valve unit 292' and control box 260'. A ram 350 extends out of the end of the cylinder 342 remote from the bracket 340. The free end of the rod 350 is connected to a bracket 352 formed on the elbow rod 302 by vertical pivot pin 354. As indicated in FIGURE 16, retraction of the rod 350 from its extended solid outline position of FIGURE 16 will effect counter-clockwise scissoring of the elbow rods 300 and 302 from their solid outline position of FIGURE 16 to their dotted outline position therein. This scissoring motion serves to effect horizontal pivotal movement of the boom 208', and hence the basket member B', from their solid to their dotted outline position in FIGURE 16. In this manner, the basket member B' may be moved between a point vertically aligned with the fish-receiving hold 20 to a point over the fish-containing net from which fish are to be removed.

Referring to FIGURE 16 it will be noted that the upper end of the bracket 312 is affixed to the lower end of an elevation control line 241' similar to that employed with the first form of boom member S. It should also be noted that the boom 208', the basket member B' and the parts associated therewith may be raised to an inoperative position by reeling in the lifting line 34' beyond the point indicated in FIGURE 16.

Referring now to FIGURE 18 there is shown a third form of boom member S" which may be used with the brailer apparatus of the present invention. The boom member S" is generally similar to the boom member S'. The boom member S", however, is provided with a second set of elbow rods 400 and 402 having their intermediate portions interconnected by a fluid pressure actuated cylinder and plunger unit 404. Retraction of the plunger within the cylinder will serve to raise the free or head end of the boom 208" from its solid to its inoperative dotted outline position of FIGURE 18. Thus, the form of brailer member shown in FIGURE 18 does not utilize the lifting line 34' to raise the boom 208" and basket member B" to their inoperative position.

The brailer apparatus of the present invention permits netted fish to be brailed in a minimum period of time and with far less physical effort than heretofore-practiced means. The use of the boom member S insures positive control over undesirable swinging of the basket member B even in rough seas. Accordingly, the utilization of such brailer apparatus will provide a valuable adjunct to a fishing boat.

Various modifications and changes may be made with respect to the foregoing detailed description without departing from the spirit of the present invention or the scope of the following claims. Thus, although the apparatus has been shown and described in conjunction with the handling of netted fish, it can also find use in handling other discrete materials.

I claim:

1. Brailer apparatus for transferring netted fish from a net onto a fishing boat, comprising: a basket member movable between an open position and a closed position, said basket member including a normally closed bag having dumping means operable to open said bag to dump the contents of said basket member; support means on said boat operatively attached to said basket member to urge said basket member between a fish receiving location within the confines of said net and a fish-discharging location over said boat; and a power-operated actuating member interposed between said support means and said basket member to move said basket member between its open and closed positions whereby said basket member may be moved into its fish-receiving location in an open position and thereafter closed to trap a portion of said netted fish, with said closed basket member thereafter being urged to said fish-discharging location and said dumping means then being operable to open said basket bag to dump said portion of fish onto said boat.

2. Brailer apparatus for transferring netted fish from a net onto a fishing boat, comprising: a basket member movable between an open position and a closed position, said basket member including a normally closed bag having dumping means operable to open said bag to dump the contents of said basket member; a power-operated boom member on said boat operatively attached to said basket member for effecting vertical and horizontal movement of said basket member between a fish-receiving location within the confines of said net and a fish-discharging location over said boat; and means operatively associated with said basket member to move said basket member between its open and closed positions whereby said basket member may be moved into its fish-receiving location in an open position and thereafter closed to trap a portion of said netted fish, with said closed basket member thereafter being urged to said fish-discharging location and said dumping means then being operable to open said bag to dump said portion of fish onto said boat.

3. Brailer apparatus for transferring netted fish from a net onto a fishing boat, comprising: a basket member movable between an open position and a closed position, said basket member including a normally closed bag having dumping means operable to open said bag to dump the contents of said basket member; a power-operated boom member on said boat operatively attached to said basket member for effecting vertical and horizontal movement of said basket member between a fish-receiving location within the confines of said net and a fish-discharging location over said boat; and an actuating member interposed between said boom member and said basket member to move said basket member between its open and closed positions whereby said basket member may be moved into its fish-receiving location in an open position and thereafter closed to trap a portion of said netted fish, with said closed basket member thereafter being urged to said fish-discharging location and said dumping means then being operable to open said bag to dump said portion of fish onto said boat.

4. Brailer apparatus for transferring netted fish from a net onto a fishing boat, comprising: a basket member movable between an open position and a closed position, said basket member including a normally closed bag having dumping means operable to open said bag to dump the contents of said basket member; a power operated boom member on said boat operatively attached to said basket member for effecting vertical and horizontal movement of said basket member between a fish-receiving location within the confines of said net and a fish-discharging location over said boat; and a power-operated actuating member interposed between said boom member and said basket member to move said basket member between its open and closed positions whereby said basket member may be moved into its fish-receiving location in an open position and thereafter closed to trap a portion of said netted fish, with said closed basket member thereafter being urged to said fish-discharging location and said dumping means then being operable to open said bag to dump said portion of fish onto said boat.

5. Brailer apparatus for transferring netted fish from a net onto a fishing boat, comprising: a basket member movable between an open position and a closed position, said basket member including a normally closed bag having dumping means operable to open said bag to dump the contents of said basket member; a boom member that includes a boom having one end pivotally attached to said boat for horizontal movement of said boom relative thereto, power-operated means for effecting said horizontal movement, and a lifting line carried by said boom attached to said basket member for elevating and lowering the latter whereby said basket member is urged between a fish-receiving location within the confines of said net and a fish-discharging location over said boat; and means operatively associated with said basket member to move said basket member between its open and closed positions whereby said basket member may be moved into its fish-receiving location in an open position and thereafter closed to trap a portion of said netted fish, with said closed basket member thereafter being urged to said fish-discharging location and said dumping means then being operable to open said bag to dump said portion of fish onto said boat.

6. Brailer apparatus for transferring netted fish from a net onto a fishing boat, comprising: a basket member movable between an open position and a closed position, said basket member including a normally closed bag having dumping means operable to open said bag to dump the contents of said basket member; a boom member that includes a boom having one end pivotally attached to said boat for horizontal movement of said boom relative thereto, power-operated means for effecting said horizontal movement, and a lifting line carried by said boom attached to said basket member for elevating and lowering the latter whereby said basket member is urged between a fish-receiving location within the confines of said net and a fish-discharging location over said boat; and an actuating member interposed between said boom member and said basket member to move said basket member between its open and closed positions whereby said basket member may be moved into its fish-receiving location in an open position and thereafter closed to trap a portion of said netted fish, with said closed basket member thereafter being urged to said fish-discharging location and said dumping means then being operable to open said bag to dump said portion of fish onto said boat.

7. Brailer apparatus for transferring netted fish from a net onto a fishing boat, comprising: a basket member movable between an open position and a closed position, said basket member including a normally closed bag having dumping means operable to open said bag to dump the contents of said basket member; a boom member that includes a boom having one end pivotally attached to said boat for horizontal movement of said boom relative thereto, power-operated means for effecting said horizontal movement, and a lifting line carried by said boom attached to said basket member for elevating and lowering the latter whereby said basket member is urged between a fish-receiving location within the confines of said net and a fish-discharging location over said boat; and a power-operated actuating member interposed between said boom member and said basket member to move said basket member between its open and closed positions whereby said basket member may be moved into its fish-receiving location in an open position and thereafter closed to trap a portion of said netted fish, with said closed basket member thereafter being urged to said fish-discharging location and said dumping means then being operable to open said bag to dump said portion of fish onto said boat.

8. Brailer apparatus for transferring netted fish from a net onto a fishing boat, comprising: a basket member movable between an open position and a closed position, said basket member including a bag having an open bottom formed with a plurality of loops; a dumping chain slidably extending through said loops; a dump line attached to one end of said dumping chain; a deflecting line having one of its ends attached to the opposite end of said dumping chain and its other end secured to said basket member, with a reduction of the length of said chain within said loops by tightening of said lines contracting the bottom of said bag closed and subsequent slacking off of said dump line permitting the lower end of said bag to again open; support means on said boat operatively attached to said basket member to urge said basket member between a fish-receiving location within the confines of said net and a fish-discharging location over said boat; and means operatively associated with said basket member to move said basket member between its open and closed positions whereby said basket member may be moved into its fish-receiving location in an open position and thereafter closed to trap a portion of said netted fish, with said closed basket member thereafter being urged to said fish-discharging location and said dump line then being slacked off to effect opening of the lower end of said bag.

9. Brailer apparatus for transferring netted fish from a net onto a fishing boat, comprising: a basket member movable between an open position and a closed position, said basket member including a bag having an open bottom formed with a plurality of loops; a dumping chain slidably extending through said loops; a dump line attached to one end of said dumping chain; a deflecting line having one of its ends attached to the opposite end of said dumping chain and its other end secured to said basket member, with a reduction of the length of said chain within said loops by tightening of said lines contracting the bottom of said bag closed and subsequent slacking off of said dump line permitting the lower end of said bag to again open; a boom member on said boat operatively attached to said basket member for effecting vertical and horizontal movement of said basket member between a fish-receiving location within the confines of said net and a fish-discharging location over said boat; and means operatively associated with said basket member to move said basket member between its open and closed positions whereby said basket member may be moved into its fish-receiving location in an open position and thereafter closed to trap a portion of said netted fish, with said closed basket member thereafter being urged to said fish-discharging location and said dump line then being slacked off to effect opening of the lower end of said bag.

10. Brailer apparatus for transferring netted fish from a net onto a fishing boat, comprising: a basket member movable between an open position and a closed position, said basket member including a net having an open bottom formed with a plurality of loops; a dumping chain slidably extending through said loops; a dump line attached to one end of said dumping chain; a deflecting line having one of its ends attached to the opposite end of said dumping chain and its other end secured to said basket member, with a reduction of the length of said chain within said loops by tightening of said lines contracting the bottom of said basket net closed and subsequent slacking off of said dump line permitting the lower end of said basket net to again open; a power-operated boom member on said boat operatively attached to said basket member for effecting vertical and horizontal movement of said basket member between a fish-discharging location over said boat; and a power-operated actuating member interposed between said boom member and said basket member ot move said basket member between its open and closed positions whereby said basket member may be moved into its fish-receiving location in an open position and thereafter closed to trap a portion of said netted fish, with said closed basket member thereafter being urged to said fish-discharging location and said dump line then being slacked off to effect opening of the lower end of said basket net.

References Cited in the file of this patent

UNITED STATES PATENTS

| 523,807 | Chaquette | July 31, 1894 |
| 1,327,324 | Hecker | Jan. 6, 1920 |
| 1,997,149 | Lake | Apr. 9, 1935 |

FOREIGN PATENTS

| 13,577 | Germany | July 12, 1956 |